(12) United States Patent
Reusche et al.

(10) Patent No.: US 7,819,084 B2
(45) Date of Patent: Oct. 26, 2010

(54) WATER AGITATION SYSTEM FOR WATER RETENTION STRUCTURE

(75) Inventors: Thomas K. Reusche, Elburn, IL (US); Philip E. Chumbley, Aurora, IL (US); Donald B. Owen, Batavia, IL (US); Joe Blahnik, St. Charles, IL (US); James R. McHugh, Downers Grove, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 1064 days.

(21) Appl. No.: 11/140,039

(22) Filed: May 27, 2005

(65) Prior Publication Data

US 2005/0217605 A1 Oct. 6, 2005

Related U.S. Application Data

(63) Continuation-in-part of application No. 10/643,055, filed on Aug. 18, 2003, now Pat. No. 7,434,538, application No. 11/140,039.

(60) Provisional application No. 60/461,964, filed on Apr. 10, 2003, provisional application No. 60/649,405, filed on Feb. 1, 2005, provisional application No. 60/680,176, filed on May 12, 2005.

(51) Int. Cl.
*A01K 7/00* (2006.01)

(52) U.S. Cl. ........................ 119/69.5; 119/74; 119/255; 119/719

(58) Field of Classification Search .................. 119/72, 119/69.5, 73, 255, 74, 719, 263; 261/93, 261/120; 210/242.2; 367/141, 139; 47/17.1; 366/342, 343, 241; 416/85, 86
See application file for complete search history.

(56) References Cited

U.S. PATENT DOCUMENTS

| | | | |
|---|---|---|---|
| 2,272,582 A | 2/1942 | Poppe | |
| 2,877,051 A | 3/1959 | Cushman et al. | |
| 3,182,970 A | 5/1965 | Ivanoff | |
| 3,189,334 A | 6/1965 | Bell | |
| 3,836,130 A | 9/1974 | Earhart et al. | |
| 4,086,306 A | 4/1978 | Yoshinaga | |
| 4,166,086 A | 8/1979 | Wright | |
| 4,216,091 A | 8/1980 | Mineau | |
| 4,448,685 A | 5/1984 | Malina | |
| 4,482,510 A | 11/1984 | Khudenko | |
| 4,681,711 A | 7/1987 | Eaton | |
| 4,748,808 A | 6/1988 | Hill | |
| 5,336,399 A | 8/1994 | Kajisono | |
| 5,356,569 A | 10/1994 | Von Berg | |
| 5,807,151 A | 9/1998 | Sumino | |
| 5,980,100 A | 11/1999 | Haegeman | |
| 6,241,221 B1 * | 6/2001 | Wegner et al. | 261/93 |
| 6,363,891 B1 * | 4/2002 | Marshall | 119/719 |

(Continued)

*Primary Examiner*—T. Nguyen
(74) *Attorney, Agent, or Firm*—McAndrews, Held & Malloy, Ltd.

(57) ABSTRACT

A water agitation system for use with a water retention structure, such as a bird bath or livestock water trough, includes a motor operatively connected to a drive shaft, and a blade assembly extending outwardly from the drive shaft. The motor is operable to rotate the blade assembly in order to impart motion to water retained within the water retention structure. According to an embodiment of the present invention, an audio source may be provided, including a sound board and speaker.

36 Claims, 16 Drawing Sheets

U.S. PATENT DOCUMENTS

| | | |
|---|---|---|
| D457,595 S | 5/2002 | Ellsworth et al. |
| 6,830,009 B1 * | 12/2004 | Kuelbs ...................... 119/52.2 |
| 2003/0211369 A1 * | 11/2003 | Riman et al. ................ 428/702 |
| 2004/0070096 A1 * | 4/2004 | Grader et al. ................. 264/42 |
| 2004/0099585 A1 * | 5/2004 | Kim ............................ 210/85 |

* cited by examiner

US 7,819,084 B2

WATER AGITATION SYSTEM FOR WATER RETENTION STRUCTURE

RELATED APPLICATIONS

This application is a continuation-in-part of pending U.S. patent application Ser. No. 10/643,055 entitled "Water Agitation System for Water Retention Structure," filed Aug. 18, 2003 now U.S. Pat. No. 7,434,538, which in turn claims priority to U.S. Provisional Patent Application No. 60/461,964 entitled "Water Agitator for Bird Baths," filed Apr. 10, 2003, all of which are incorporated by reference herein in their entireties. Additionally, this application relates to and claims priority benefits from (i) U.S. Provisional Application No. 60/649,405, entitled "Running Water Sound Generator for Birdbaths," filed on Feb. 1, 2005, which is incorporated by reference herein in its entirety, and (ii) U.S. Provisional Application No. 60/680,176 entitled "Solar Powered Water Agitation System," filed on May 12, 2005, which is also incorporated by reference herein in its entirety

BACKGROUND OF THE INVENTION

The present invention generally relates to water retention structures, such as bird bath basins, livestock water tanks/troughs, swimming pools, small ponds, fish tanks, and the like, and more specifically to a water agitator for placement in a water retention structure, to agitate or circulate water contained in the water retention structure.

Various water retention structures exist for a variety of purposes. For example, bird baths retain water for birds to bathe and frolic; swimming pools retain water for recreational purposes; backyard ponds retain water for aesthetic purposes (such as a habitat for small fish); livestock water tanks/troughs hold water for livestock to drink; water towers store water for various uses; and so on.

Bird baths are popular for attracting birds to residential homes, for example, and they may promote an interest in, and the well-being of, birds. An exemplary bird bath is described in U.S. Pat. No. 6,484,666, issued Nov. 26, 2002 to Thomas K Reusche, and assigned to Allied Precision Industries, Inc., which is hereby incorporated by reference in its entirety.

People may desire to increase the number of birds attracted to a bird bath. Birds may be attracted to a bird bath by sounds and sights. It may be difficult for a bird to see a shallow, still pool of water in a bird bath. If, however, the bird perceives sights and sounds emanating from a bird bath, the bird may find the bird bath more inviting. A bird may find the bird bath especially attractive if sights and sounds are of the type a bird might normally associate with a body of fresh, clean water.

People may also desire to reduce the power consumption associated with a bird bath. For example, people may want the bird bath to operate only during daylight hours. Additionally, people may desire to reduce the difficulty in setup and maintenance associated with a bird bath. It may be desirable, for example, to have the birdbath operable without being plugged into an extension cord or outlet. It also may be desirable to operate the birdbath with a renewable power source.

FIG. 1 illustrates an isometric view of a bird bath 100. The bird bath 100 includes a base 102 that supports a column 104, which in turn supports a basin 106. The basin 106 is configured to receive and retain water.

It is known to provide pumps for imparting motion to the water in the bird bath basin. Movement of the water tends to attract birds to the bath. It also reduces the potential for the bird bath to serve as a haven for insects, e.g., mosquitoes, bacteria, germs, and the like. Water movement, or circulation, within the bird bath is particularly important given the recent rise of West Nile virus within the United States. However, pumps typically require access to an electrical outlet and are therefore not suitable when an electrical outlet is not readily available. Additionally, existing birdbaths cannot be easily retrofitted with such pumps.

Stagnant water in water retention structures typically increases the rate of breeding of insects, bacteria, germs, and the like. Further, stagnant, stale water is typically undesirable for a host of additional reasons. For example, the taste, odor and physical appearance of stagnant, stale water may be objectionable.

Thus, a need exists for an apparatus for imparting motion to water retained within water retaining structures, such as bird baths and livestock water tanks/troughs. A need also exists for associating motion and sound within water retaining structures, such as bird baths and livestock water tanks/troughs. A need also exists to ensure low power consumption and simple setup and maintenance in systems that satisfy these needs.

BRIEF SUMMARY OF THE INVENTION

A water agitation system adapted to be positioned within a water retention structure configured to receive and retain water, includes a main body positioned within a water retention area of the water retention structure. The water retention structure may be a basin of a bird bath, a livestock water tank/trough, a swimming pool, water tower, or a pond. The main body includes a base removably secured to a cover, and an inner compartment defined between the base and cover. A seal member may be interposed between the cover and the base. The system also includes at least one support member that supports the main body above a bottom surface of the water retention structure. The support members include a plurality of legs that extend downwardly from the main body. Optionally, the system may include a flotation member configured to allow the system to float on water within the water retention structure.

An agitator is operatively connected to a motor that is positioned within the inner compartment of the main body. The agitator is connected to a distal end of a drive shaft that extends outwardly from the main body. At least one blade extends from a lateral surface of the drive shaft that is rotatably driven by the motor in order to impart motion to water retained within the water retention structure.

Certain embodiments of the present invention provide a liquid agitation system configured to be positioned within a liquid retention structure. The liquid agitation system includes a main body positionable within a liquid retention area of the liquid retention structure, an agitation assembly including an agitator operatively connected to a motor housed substantially within the main body, and an audio source. In another embodiment, at least a portion of said audio source is disposed within the main body. In another embodiment, the liquid agitation system further includes at least one power source configured to supply power to said motor and said audio source. The power source may include at least one battery. In another embodiment, the power source includes an alternating current source. In another embodiment, the liquid agitation system further includes a solar module configured to recharge the battery. In another embodiment, at least a portion of the body resonates responsively to at least a portion of audible frequencies. In another embodiment, the audio source includes at least one speaker. In another embodiment, the speaker includes a piezoelectric crystal. In another embodiment, the audio source includes digital circuitry configured to provide electrical signals to the speaker. In another embodiment, the liquid agitation system further includes an acoustical absorber capable of damping at least a portion of sounds generated at least in part by the liquid agitation system. In another embodiment, the acoustical absorber includes foam. In another embodiment, the liquid agitation system further includes an outer shell capable of being positioned on the body. In another embodiment, the liquid agitation system further includes foam at least partially interposed between the body and the outer shell. In another embodiment, the outer shell is part of the body. In another embodiment, the outer shell is formed of at least one of: pottery, terra cotta, ceramic, and plastic. In another embodiment, the outer shell has a beehive shape.

Certain embodiments of the present invention also provide a wildlife attracting system including at least one electric power supply, a motor and an audio source, each configured to draw electrical energy from the electric power supply. The motor is adapted to transform at least a portion of the electrical energy into mechanical energy, and the audio source is adapted to transform at least a portion of the electrical energy into acoustical energy. The system also includes an agitator disposable in a liquid. The agitator is adapted to transfer mechanical energy from the motor to the liquid. In another embodiment, a solar module is configured to recharge a battery.

Certain embodiments of the present invention also provide a method for attracting wildlife including disposing a liquid agitator in a liquid, interfacing the liquid agitator with a motor. The liquid agitator and the motor are adapted to impart a motion in said liquid, and cause a generation of sounds during at least a portion of the time when the liquid is in motion. The sounds may emanate from a source proximate to the liquid. In another embodiment, the sounds may be indicative of moving water. In another embodiment, the sounds may be indicative of wildlife.

Certain embodiments of the present invention also provide a wildlife attracting system including a substantially water resistant housing having an interior space, and an agitator assembly including a motor operatively connected to an agitator. The motor is adapted for driving the agitator, and the motor is capable of generating acoustical energy that propagates along a propagation path. The system also includes an acoustically absorptive material positioned along at least a portion of the propagation path.

Figure 1:
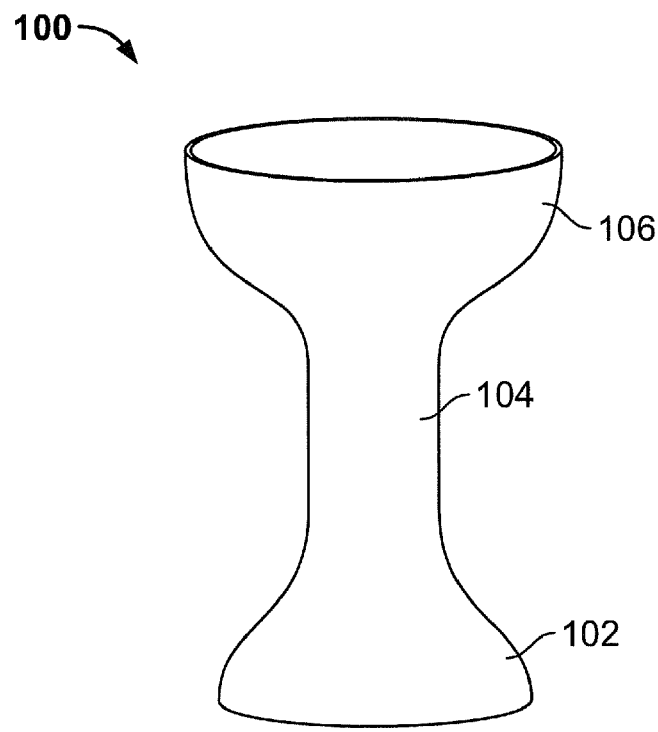
FIG. 1 illustrates an isometric view of a bird bath.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIGS. 2-9 illustrate a water agitation system 10 according to an embodiment of the present invention. The water agitation system 10 may be sized and constructed for placement in the basin of a bird bath, such as the bird bath 100 shown in FIG. 1, for imparting motion to water contained in the basin. Optionally, the water agitation system 10 may be sized and constructed for use with livestock water tanks/troughs, small ponds, swimming pools, water towers, and various other water retaining structures.

Figure 10:
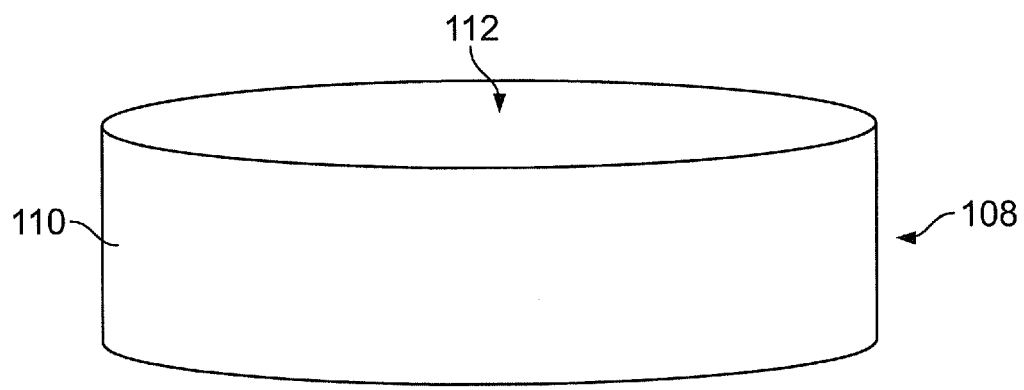
FIG. 10 illustrates a water retention structure.

FIG. 10 illustrates a water retention structure 108, in general. The water retention structure 108 includes a main body 110 defined by outer walls, which in turn define an interior cavity 112. The interior cavity 112 is configured to receive and retain water. The water retention structure 108 may also include a series of pumps, pipes, and the like (not shown) in order to allow the passage of water into and out of the interior cavity 112. The water retention system 108 may be formed in various shapes and sizes and may have an open top (such as a basin of a bird bath), or may be completely enclosed (such as a water tower). For example, the water retention structure 108 may be a basin of a bird bath such as the bird bath 100 shown in FIG. 1, a swimming pool, a livestock water trough, a backyard pond, etc.

Figure 2:
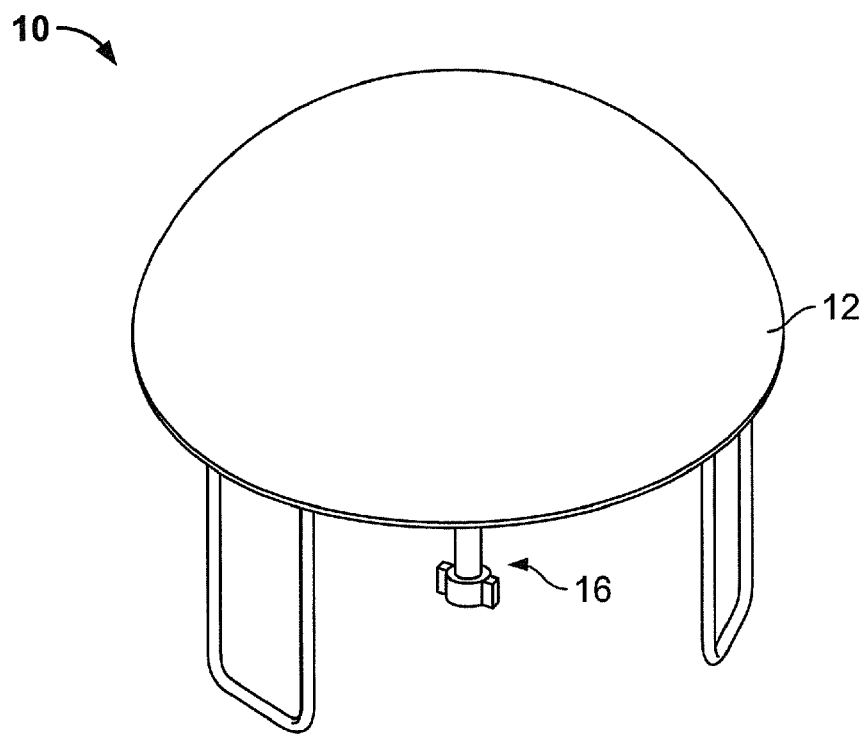
FIG. 2 illustrates an isometric view of a water agitation system according to an embodiment of the present invention.

FIG. 2 illustrates an isometric view of a water agitation system 10 according to an embodiment of the present invention. The water agitator generally comprises a housing 12, a motor 14 (shown in FIG. 5A) positioned within the housing 12, and an agitating mechanism, or agitator, 16 driven by the motor 14 so as to impart motion to water contained within a water retention structure, such as a basin of a bird bath.

Figure 3:
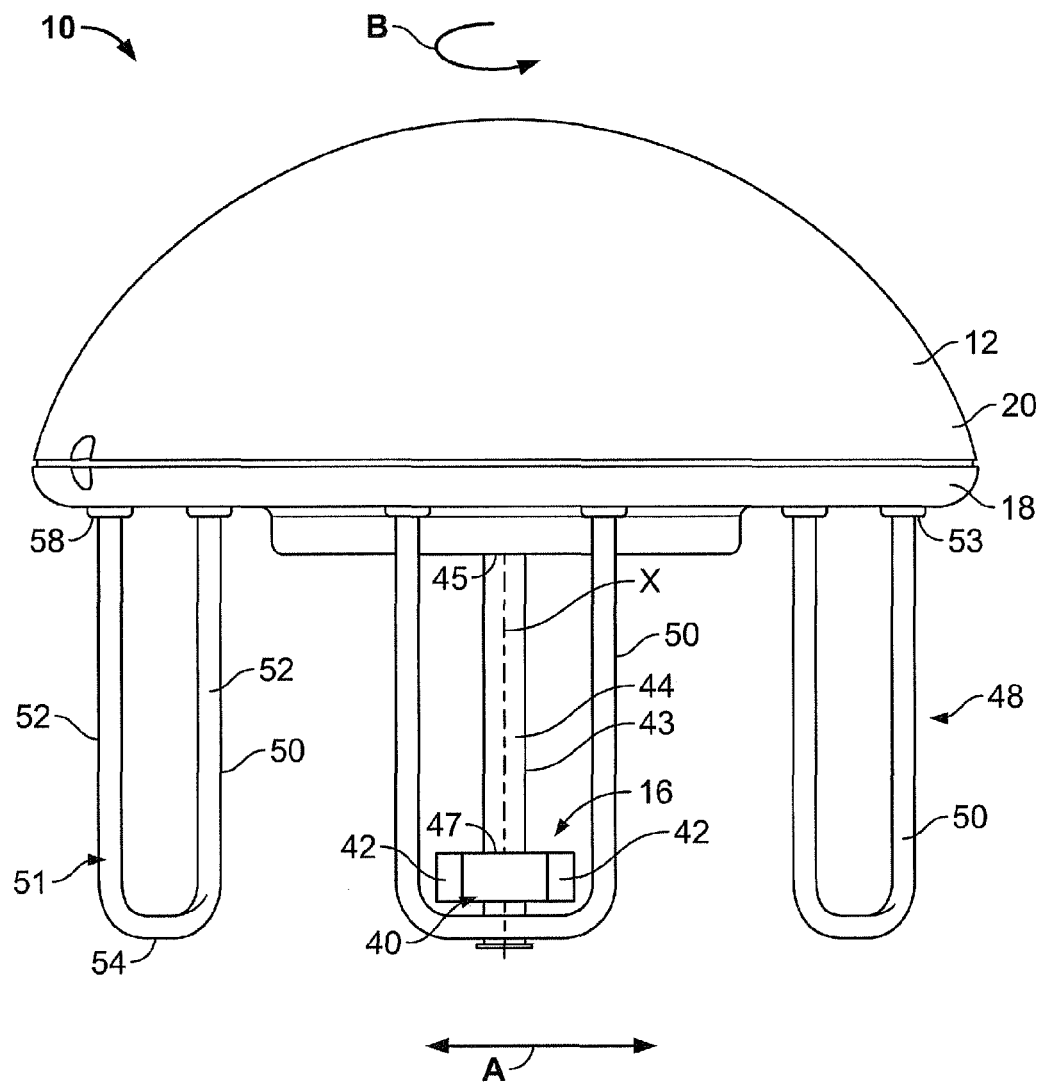
FIG. 3 illustrates a front elevation view of a water agitation system according to an embodiment of the present invention.

FIG. 3 illustrates a front elevation view of the water agitation system 10 of FIG. 2. The housing 12 includes a base 18 and a cover 20 that define an inner compartment 22 (shown, e.g., in FIG. 5A).

Figure 5A:
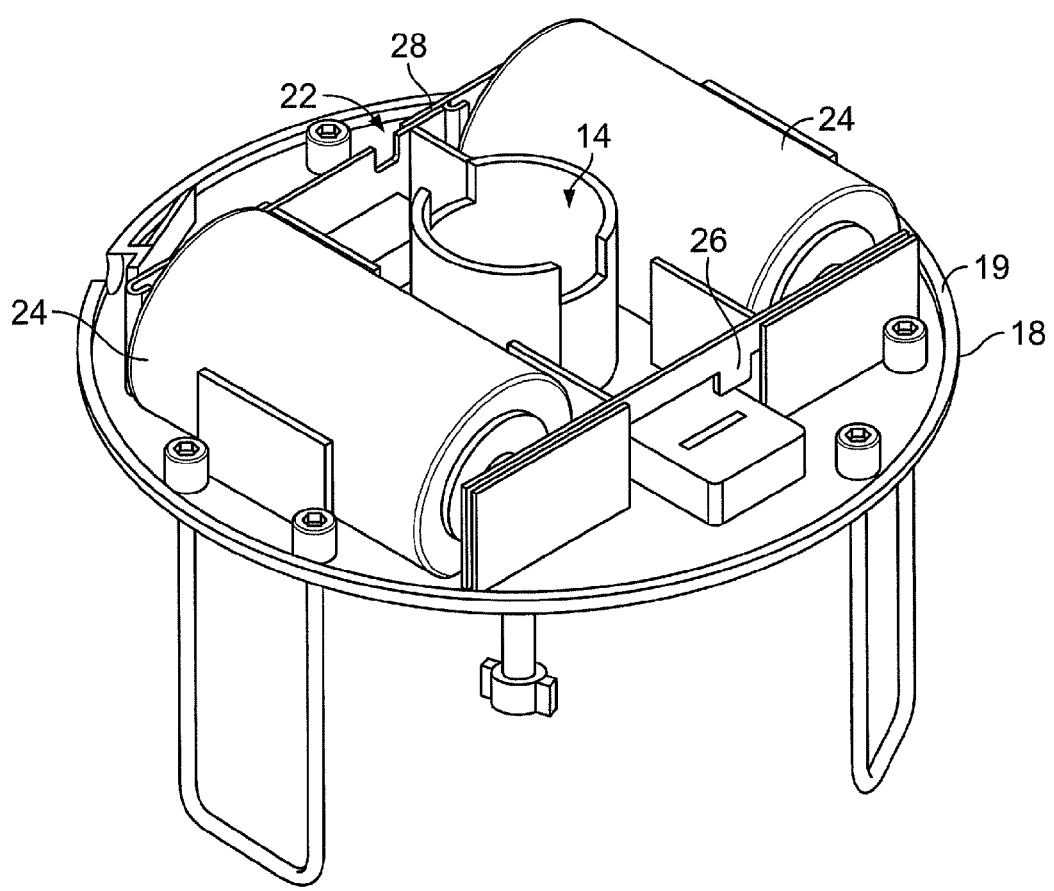
FIGS. 5A and 5B illustrate isometric views of a water agitation system according to an embodiment of the present invention.
Figure 5B:
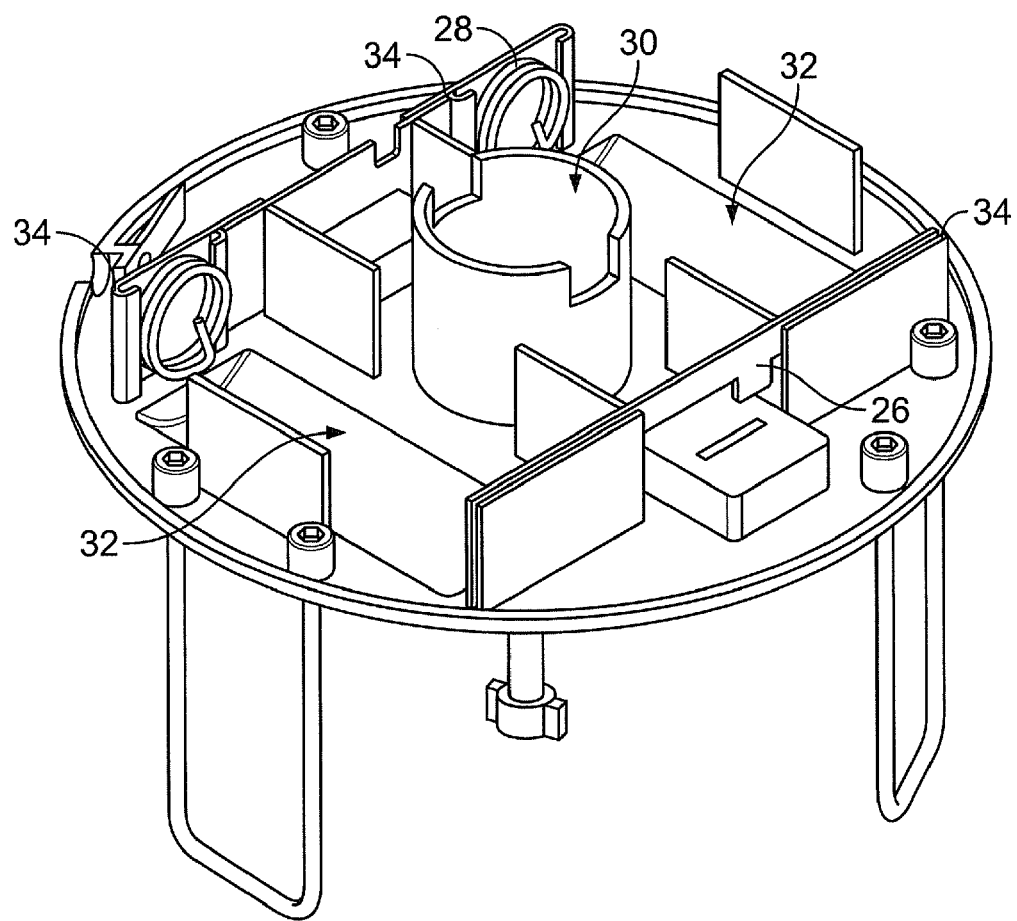
Figure 6A:
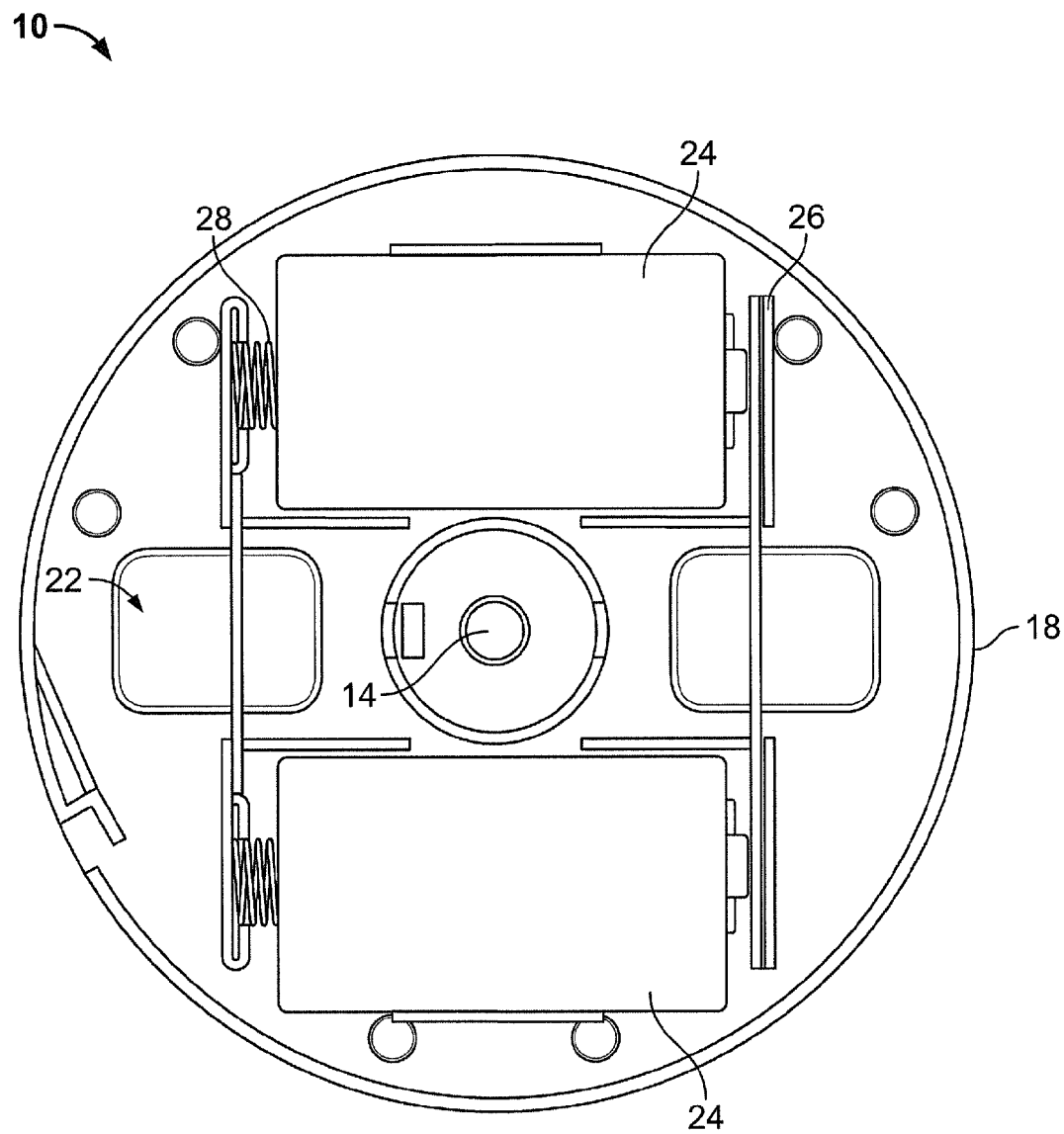
FIGS. 6A and 6B illustrate a top elevation view of the water agitation system of FIGS. 5A and 5B, respectively.
Figure 6B:
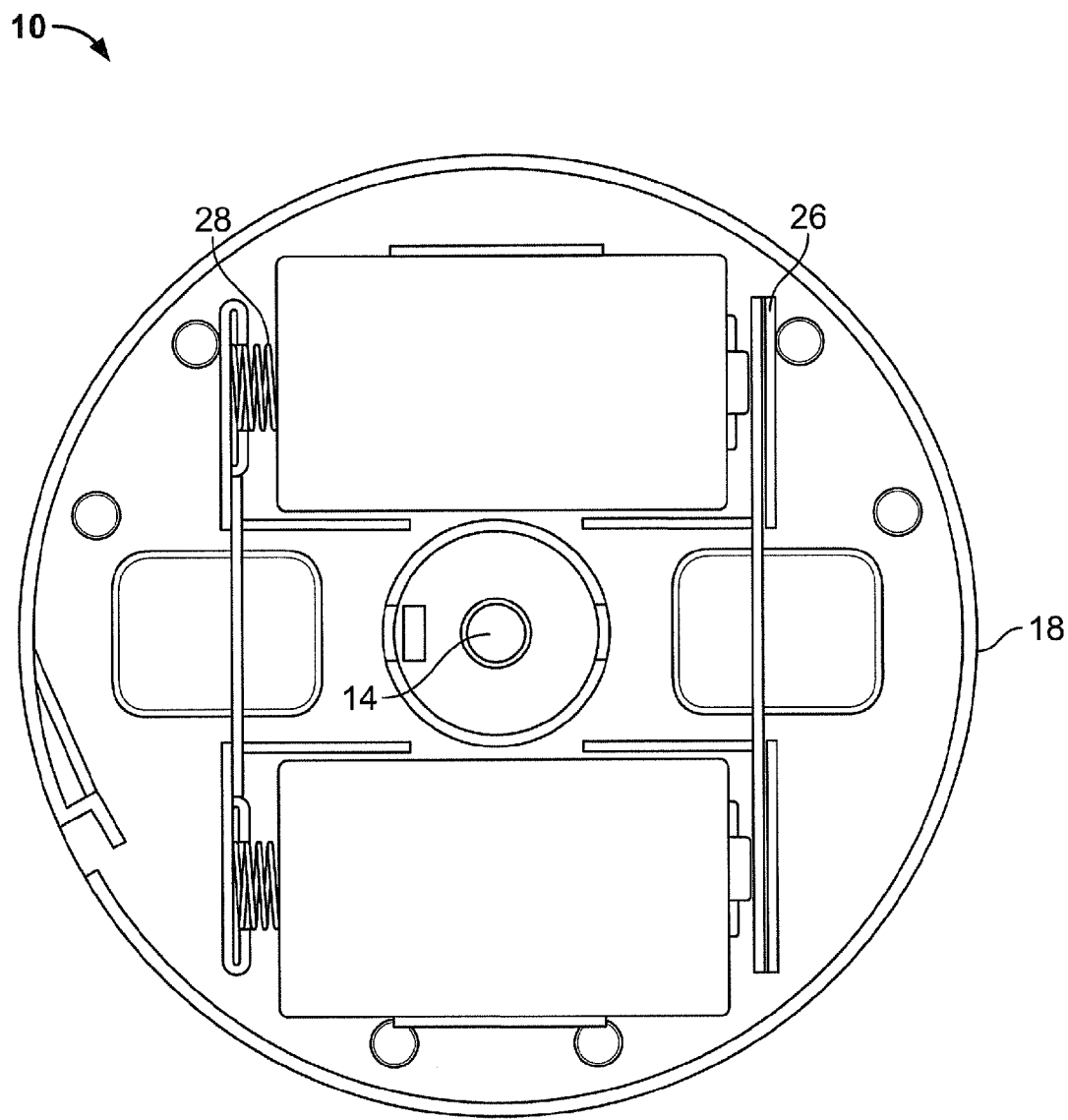
Figure 7:
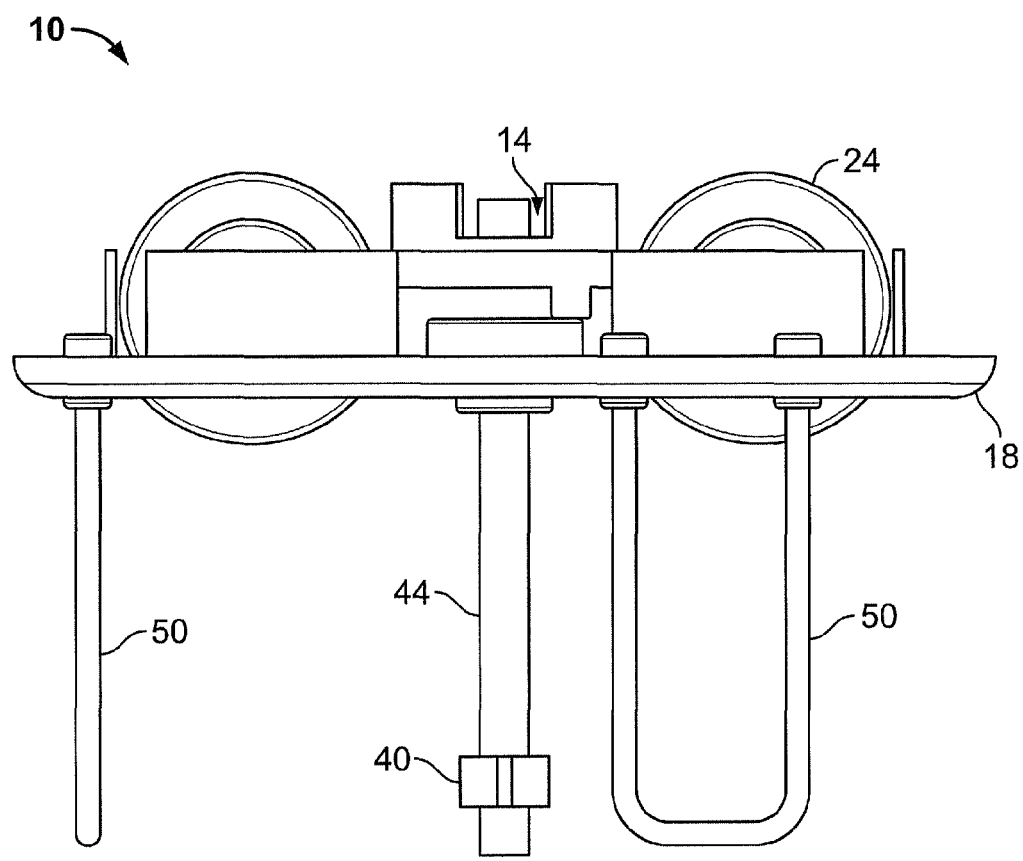
FIGS. 7 and 8 illustrates side elevation views of the water agitation system of FIG. 5A.
Figure 8:
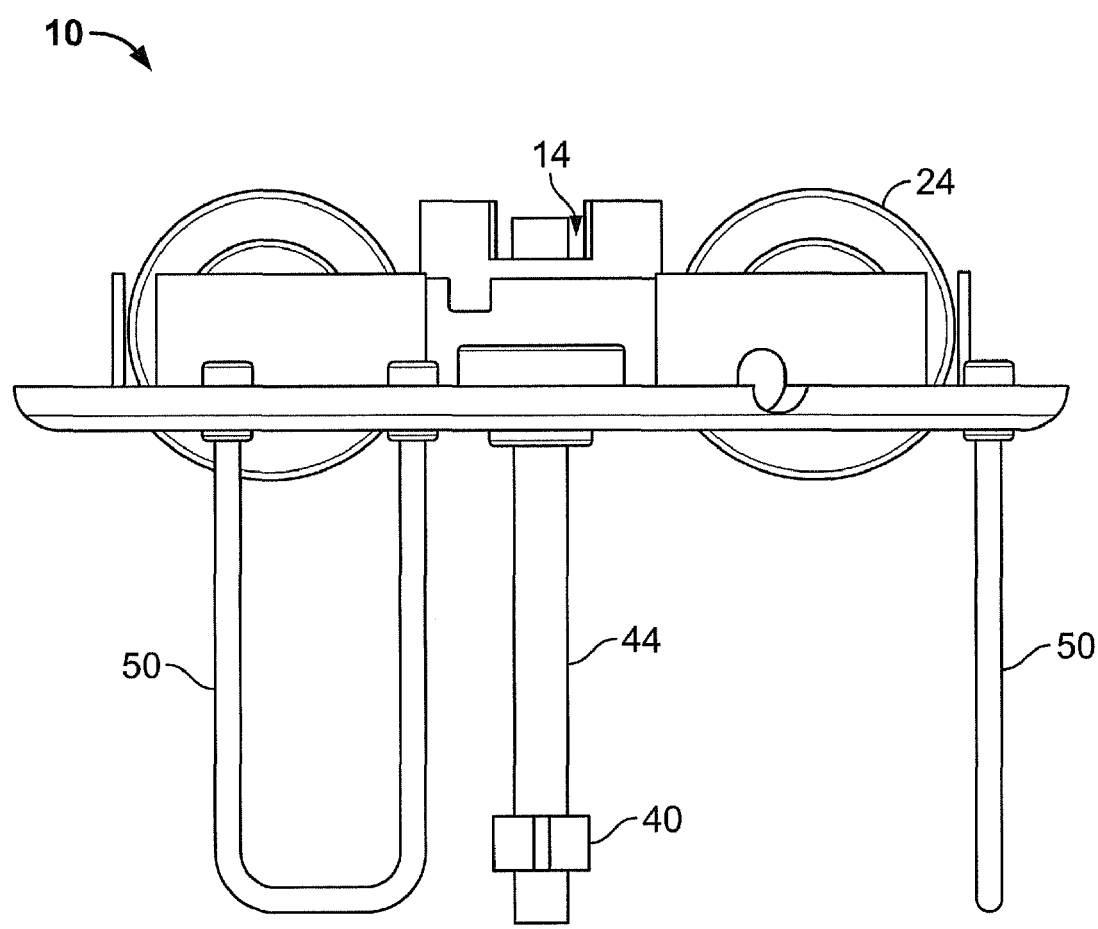
Figure 9:
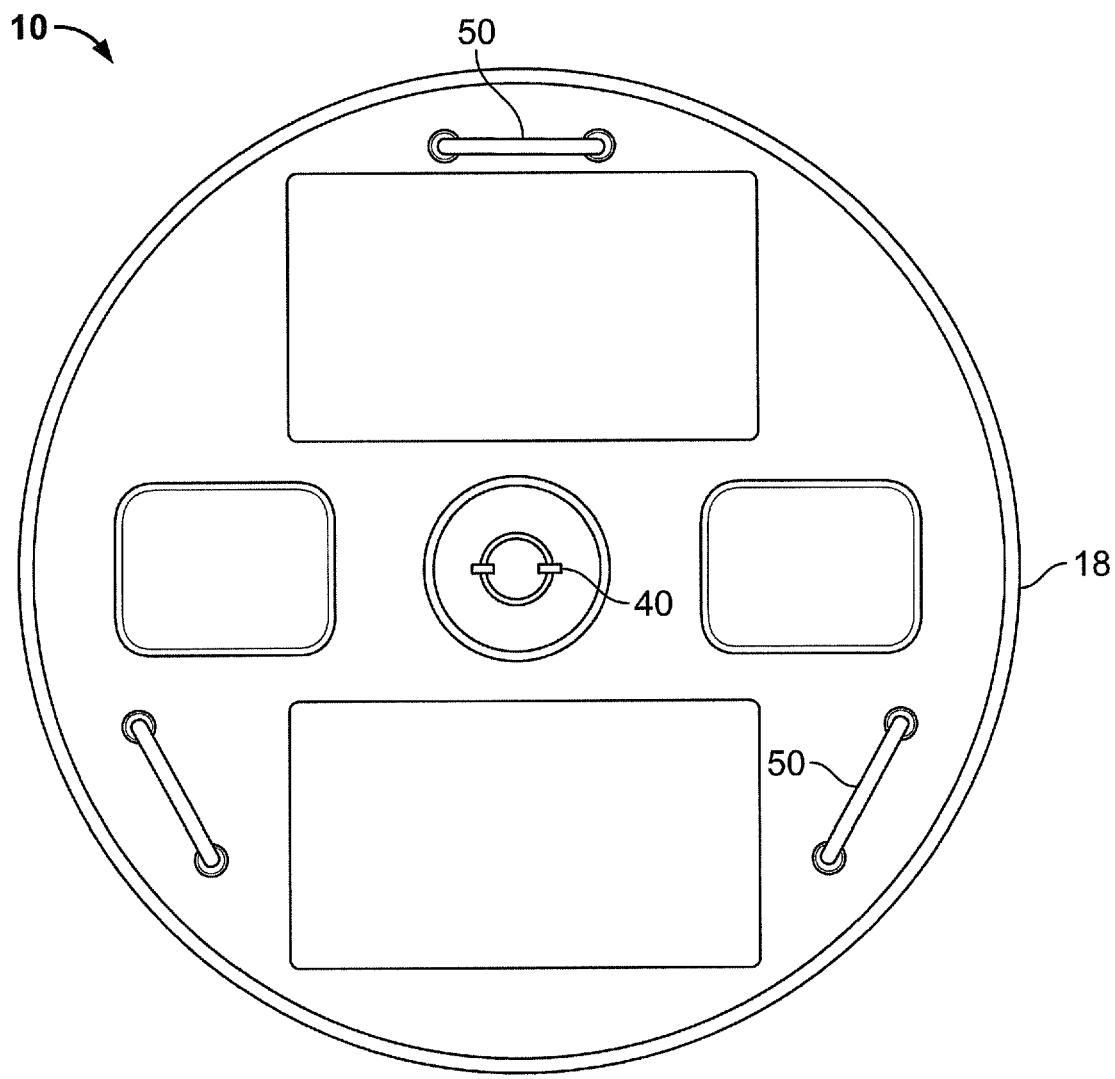
FIG. 9 illustrates a bottom plan view of the water agitation system of FIG. 2.

FIGS. 5A and 5B illustrate isometric views of the water agitation system 10 of FIG. 2, with the cover 20 of the housing 12 removed. The motor 14 is mounted within the inner compartment 22 to protect against moisture. The motor 14 may be battery operated such that batteries 24 (or battery) are also positioned within the inner compartment 22 to protect them from moisture. Positive and negative terminals 26, 28 interconnect the batteries 24 with the motor 14 for supplying power to the motor 14. The positive connection terminal 26 may be a conductive plate, whereas the negative terminal 28 may be a spring member. The upper surface 19 of the base 18 includes integrally formed features for supporting the motor 14, the batteries 24, and connection terminals 26, 28 within the housing 12. Specifically, the base 18 defines a motor compartment 30 for the motor 14, battery compartments 32 for the batteries 24, and mounting brackets 34 for the terminals 26, 28.

Optionally, the water agitation system 10 may be configured to receive power from an electrical outlet. That is, the water agitation system 10 may not use batteries, but instead may receive power from a standard electrical outlet or power source. Also, the water agitation system 10 may be operatively connected to a solar cell, such that the water agitation system 10 is operated through solar power.

Referring again to FIGS. 2 and 3, the base 18 and the cover 20 may be molded from a polymeric material such as plastic. The cover 20 may be dome shaped, but may also be shaped and sized in various other configurations without departing from the scope of the present invention. The cover 20 may be removably connected to the base 18 to provide access to the inner compartment 22 in order, for example, to replace the batteries 24. A variety of methods may be used for interconnecting the cover 20 and the base 18. For example, the cover 20 and base 18 may be interconnected by a threaded connection. Alternatively, the base 18 may snapably, latchably, or otherwise removably engage the cover 20. A seal member (not shown) may be interposed between the cover 20 and the base 18 for sealing against moisture infiltration into the housing 12. The seal member may be in the form of a compressible elastomeric seal, such as a rubber o-ring.

FIG. 3 illustrates a front elevation view of the water agitation system 10 of FIG. 2. The agitating mechanism 16 is driven by the motor 14 so as to impart motion to water contained within a water retention structure. In the illustrated embodiments, the agitating mechanism 16 includes a blade assembly 40 that is rotatably driven by the motor 14. The agitating mechanism 16 is configured to agitate water within a water retaining structure. That is, the blade assembly 40 is rotated in order to agitate, stir, circulate, or otherwise move surrounding water within a water retaining structure.

The blade assembly 40 is shown having two blades 42, but fewer or a greater number of blades may be provided. A drive shaft 44 interconnects the motor 14 to the blade assembly 40. The drive shaft 44 has a first end 45 connected to the motor 14 and a second end 47 connected to the blade assembly 40. The drive shaft 44 passes through the housing 12 in a sealed manner. The blades 42 extend outwardly from lateral surfaces 43 of the drive shaft 44 in directions defined by line A that is perpendicular to a longitudinal axis X of the drive shaft 44. In operation, the motor 14 rotates the drive shaft 44 in a direction shown by B. Because the blade assembly 40 is connected to the second end 47 of the drive shaft 44, the blades 42 of the blade assembly 40 move in the same direction. The movement of the blades 42 in the B direction within a water retention area of a water retention structure causes a corresponding movement, or circulation, of water within the water retention area. That is, the movement of the blades 42 imparts movement of water within the water retention area.

Optionally, the blades 42 may extend outwardly from the drive shaft in different directions. Also, the blades 42 may be placed at different positions along the length of the drive shaft 44. Additionally, the drive shaft 44 may itself be the agitation member. For example, the drive shaft 44 may have a flat or non-uniform surface, or it may be mounted slightly off-center.

As shown, for example, in FIG. 3, the drive shaft 44 passes through the base 18 of the housing 12. As such, the blade assembly 40 is located below the base 18 of the housing 12. A support structure 48 is provided for supporting the housing 12 above the water retention structure. In the illustrated embodiment, the support structure 48 includes a plurality of legs 50 that extend downwardly from the base 18. In the illustrated embodiment, the legs 50 are U-shaped. Each support leg 50 includes a pair of upstanding members 52 and a lower cross member 54 that interconnects the lower ends 51 of the upstanding members 52 and abuts the surface of the water retention structure. The upper ends 53 of the upstanding members 52 are connected to the base 18. The base 18 includes integral mounting brackets 58 that are configured to receive the upstanding members.

Alternatively, the drive shaft 44 may extend upwardly from the housing 12, in order to locate the blade assembly 40 above the housing 12. In such a design, the support structure 50 may be eliminated and the housing 12 may rest directly on the upper surface of the water retention structure.

Figure 4:
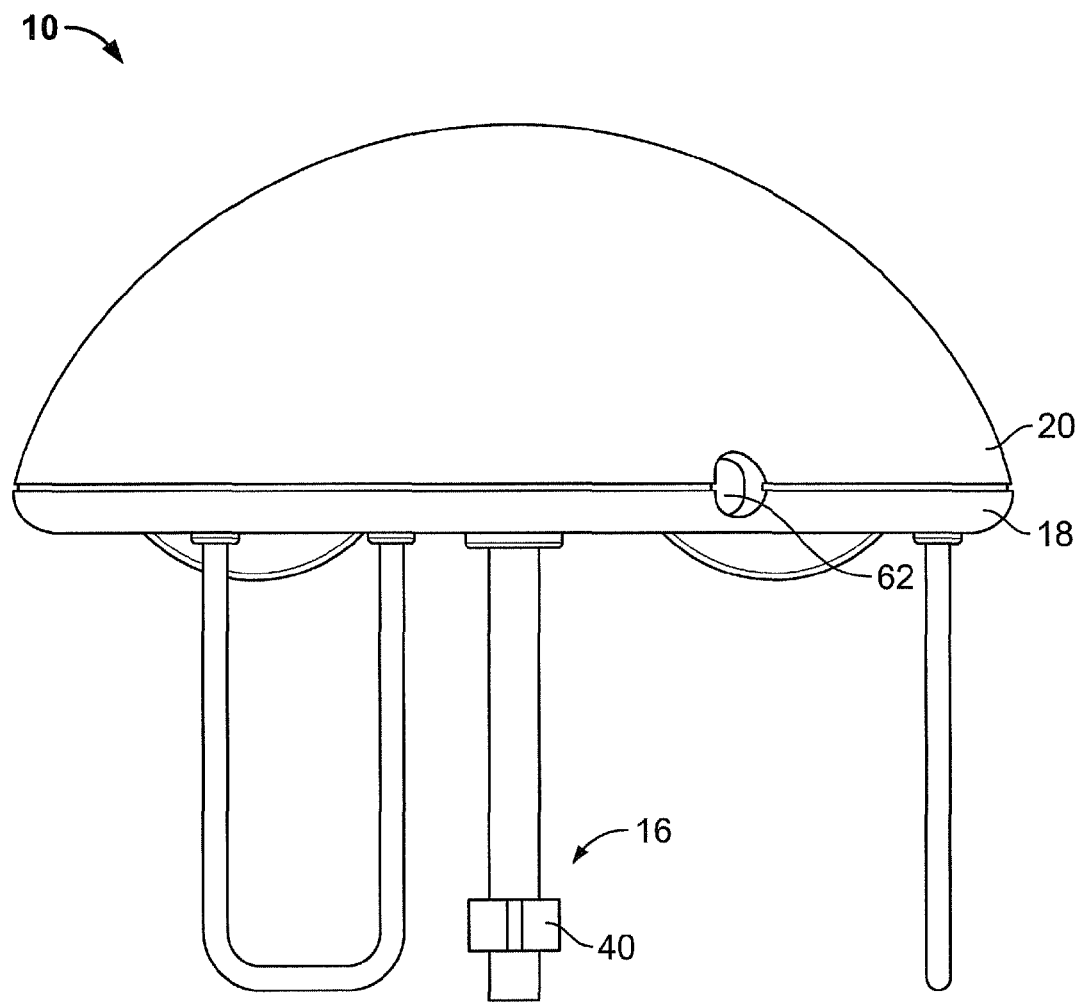
FIG. 4 illustrates a side elevation view of a water agitation system according to an embodiment of the present invention.

FIG. 4 illustrates a side elevation view of the water agitation system 10 of FIG. 2. The water agitation system 10 may include a switch or timer, such as a photocell sensor 62, for selectively delivering power to the motor 14. The photocell sensor 62 is interconnected with the motor for activating the motor 14 in the presence of light and deactivating the motor 14 in the absence of light. The photocell sensor 62 may be used to activate the motor 14 during the day and to deactivate the motor 14 at night to conserve battery power. Alternatively, a switch (not shown) may be provided to allow the user to manually activate/deactivate the motor 14. As another alternative, a timer (not shown) may be provided to allow the user to set the time(s) during which the motor 14 is active and inactive. When a photocell is provided, it may also be desirable to provide a bypass mechanism for bypassing the photocell. Such a bypass mechanism may take the form of a switch (not shown). Alternatively, a wire within the housing can be moved between terminals to bypass the photocell. Additionally, the photocell sensor 62 may be enclosed within the system 10 and configured to detect light and/or infrared radiation through the cover.

Figure 11:
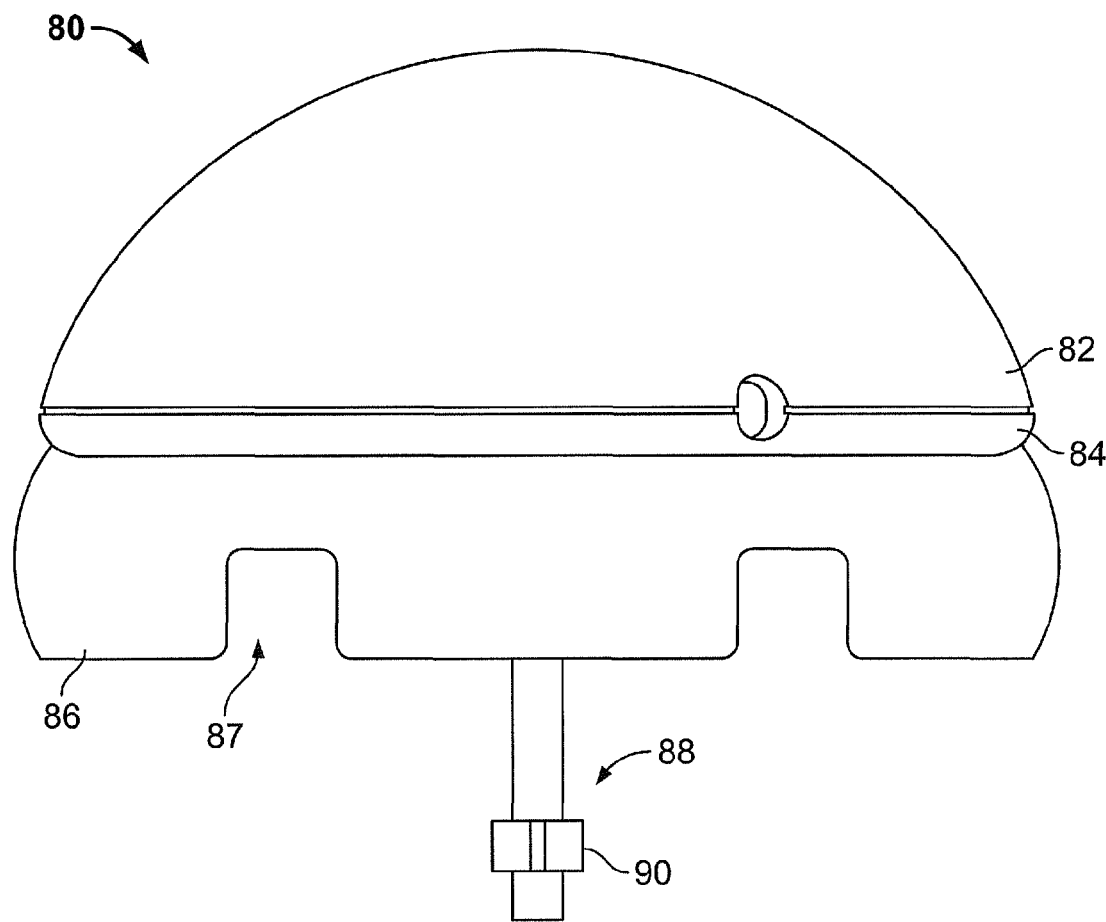
FIG. 11 illustrates a side elevation view of a water agitation system according to an alternative embodiment of the present invention.

FIG. 11 illustrates a side elevation view of a water agitation system 80 according to an alternative embodiment of the present invention. The water agitation system 80 includes a housing 82 that encloses a motor (as discussed above) and a base 84 integrally formed with a flotation member 86. Similar to the embodiments described above, an agitator 88 having a blade assembly 90 is operatively connected to the motor. The water agitation system 80 is similar to the water agitation system 10 except that the system 80 includes a flotation member 86, but does not include support structures, such as the support structures 48 shown, for example, in FIG. 3. The flotation member 86 has channels 87 formed therethrough. The flotation member 86 may be a ring of buoyant material, such as styrofoam, or an airtight tube filled with air. In particular, the flotation member may be a rubber tube or membrane that may be filled with air. In this case, the rubber membrane protects the motor and components within the housing 82 against water infiltration. Instead of a ring, the flotation member 86 may include a plurality of pontoons positioned underneath the housing 82. Preferably, the flotation member 86 provides enough buoyancy to ensure that the water agitation system 80 floats so that the agitator 88 does not abut against a surface of a water retention structure. Optionally, the flotation member 86 may be positioned within the housing 82, instead of extending downwardly from the base 84, as shown in FIG. 11.

Figure 12:
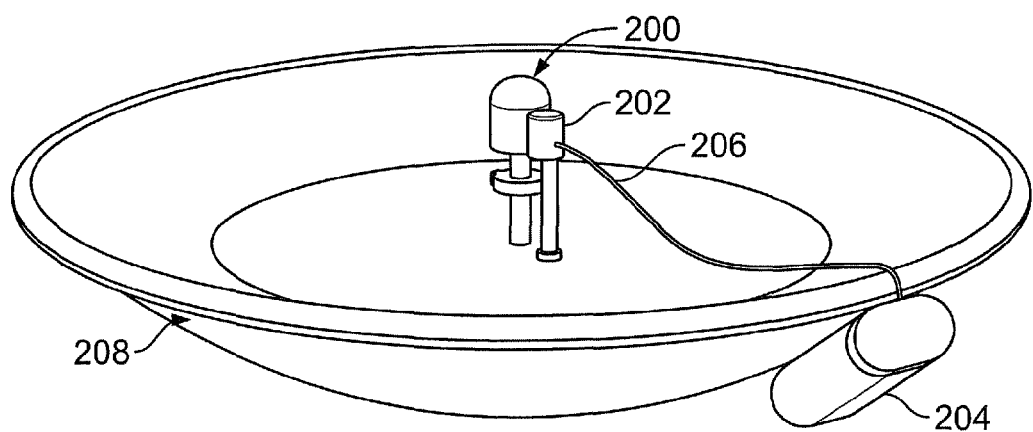
FIG. 12 illustrates an isometric view of a water agitation system according to another alternative embodiment of the present invention.

FIG. 12 illustrates an isometric view of a water agitation system 200 according to another alternative embodiment of the present invention. The water agitation system 200 includes a water agitation assembly 202 that is electrically connected to a remote power pack 204 through a water proof cable, or wire, 206. The water agitation assembly 202 is positioned within a water retention structure 208, such as a bird bath basin. The power pack 204 houses batteries, or may optionally provide an electrical connection between the water agitation assembly 202 and an electrical outlet. The water agitation assembly 202 houses a motor that operatively connects to a drive shaft having an agitation mechanism (as described above). Because the power pack 204 is located remotely from the water agitation assembly 202, less space within the water retention structure is occupied by the water agitation assembly 202.

Figure 13:
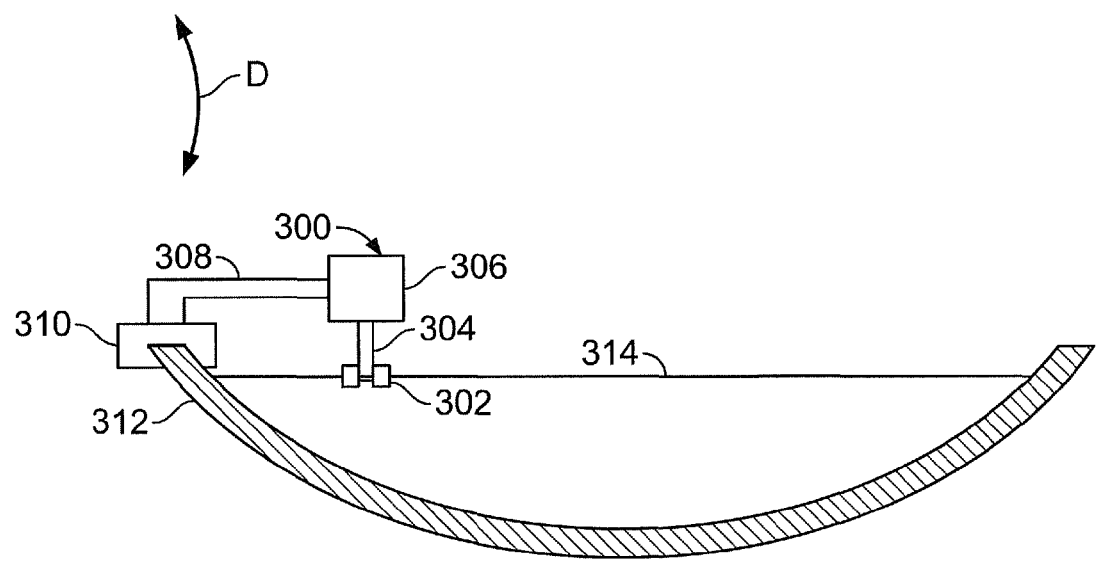
FIG. 13 illustrates a lateral view of a water agitation system according to another alternative embodiment of the present invention.

FIG. 13 illustrates a lateral view of a water agitation system 300 according to another alternative embodiment of the present invention. The water agitation system 300 includes an agitator 302 integrally formed with a drive shaft 304, which is in turn operatively connected to a motor positioned within a housing 306. The housing 306 is connected to a beam 308 that connects to a mounting bracket 310 that is secured to a portion of a water retention structure 312. The housing 306 may or may not include a battery compartment as discussed above with respect to other embodiments. The water agitation system 300 is configured so that the agitator 302 is positioned within water 314 retained by the water retention structure 312. The agitator 302 may be configured to float on the water 314 (e.g., the agitator 302 may be formed of a buoyant material such as Styrofoam or the like) or to be submerged within the water 314.

The beam 308 may flex in the directions of D depending on the water level within the water retention structure 312. That is, if the agitator 302 floats on the water 314, the agitator 302 rises and falls depending on the water level. The movement of the agitator 302 causes the housing 306 to move in response thereto, which in turn causes the beam 308 to flex accordingly.

Figure 14:
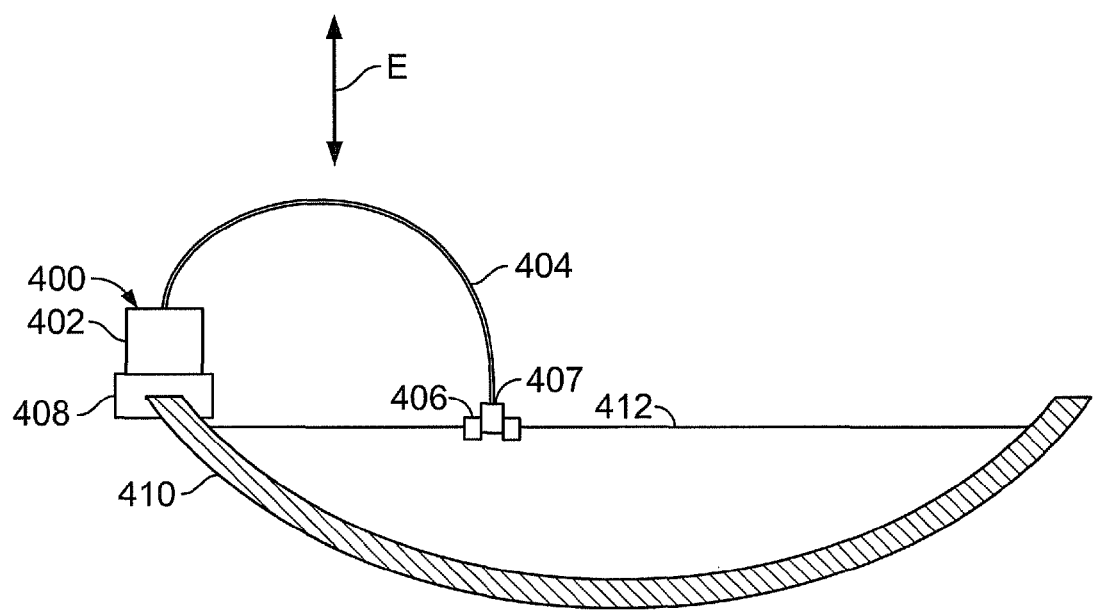
FIG. 14 illustrates a lateral view of a water agitation system according to another alternative embodiment of the present invention.

FIG. 14 illustrates a lateral view of a water agitation system 400 according to another alternative embodiment of the present invention. The system 400 includes a housing 402 having a motor that is operatively connected to a flexible wire 404. An agitator 406 is connected to a distal end 407 of the flexible wire 404. The housing 402 is supported by a bracket 408, which is secured to a portion of a water retention structure 410. The system 400 may include a battery compartment or it may be electrically connected to a standard electrical outlet.

The agitator 406 may be formed of a buoyant material and float on the surface of the water 412. The flexible wire 404 may be rigid enough to retain a general curved shape as shown in FIG. 14. Similar to the system 300, the level of the water 412 may cause the wire 404 to move in response thereto in the directions of E. The motor operates to rotate the wire 404, which is securely attached to the agitator 406. Thus, the agitator rotates in response to the rotation of the wire 404.

Figure 15:
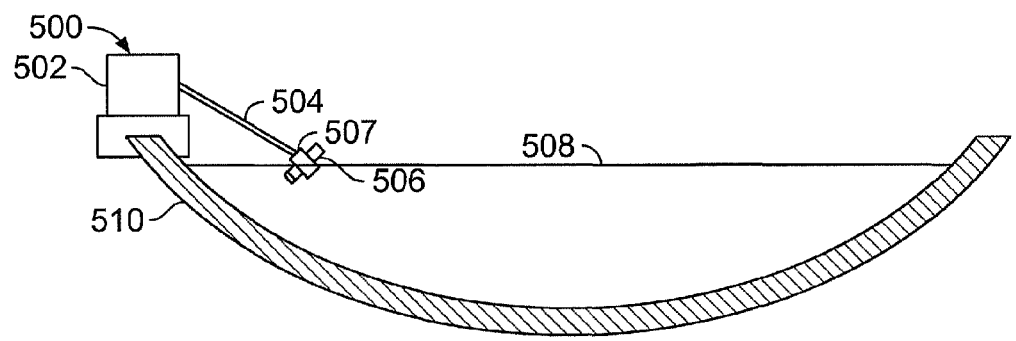
FIG. 15 illustrates a lateral view of a water agitation system according to another alternative embodiment of the present invention.

FIG. 15 illustrates a lateral view of a water agitation system 500 according to another alternative embodiment of the present invention. The system 500 includes a housing 502 having a motor that is operatively connected to an angled drive shaft 504. The angled drive shaft 504 is angled such that an agitator 506 that is secured to a distal end 507 of the drive shaft 504 is positioned within water 508 retained within a water retention structure 510. The housing 502 is supported by a bracket 512, which is secured to a portion of the water retention structure 510. The system 500 may include a battery compartment or it may be electrically connected to a standard electrical outlet.

Figure 16:
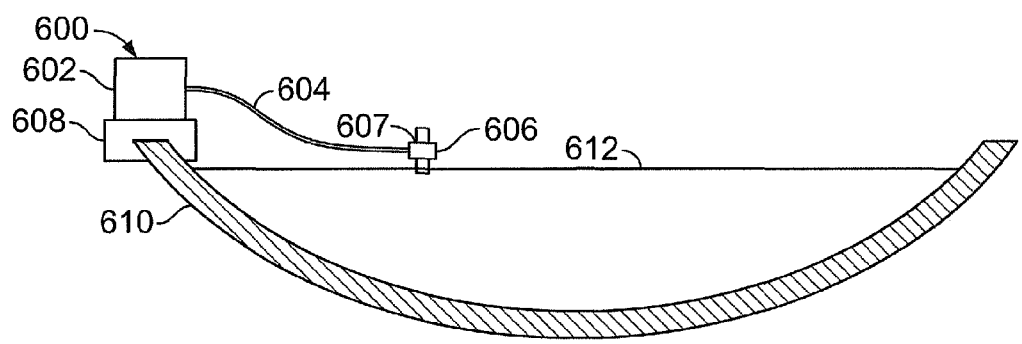
FIG. 16 illustrates a lateral view of a water agitation system according to another alternative embodiment of the present invention.

FIG. 16 illustrates a lateral view of a water agitation system 600 according to another alternative embodiment of the present invention. The system 600 includes a housing 602 having a motor that is operatively connected to a flexible wire 604. An agitator 606 is connected to a distal end 607 of the flexible wire 604. The housing 602 is supported by a bracket 608, which is secured to a portion of a water retention structure 610. The system 600 may include a battery compartment or it may be electrically connected to a standard electrical outlet.

The agitator 606 may be formed of a buoyant material and float on the surface of water 612 retained by the water retention structure 610. The flexible wire 604 may be float on the surface of the water 612 or submerge into the water 512. The motor operates to rotate the wire 604, which is securely attached to the agitator 606. Thus, the agitator rotates in response to the rotation of the wire 604.

Figure 17:
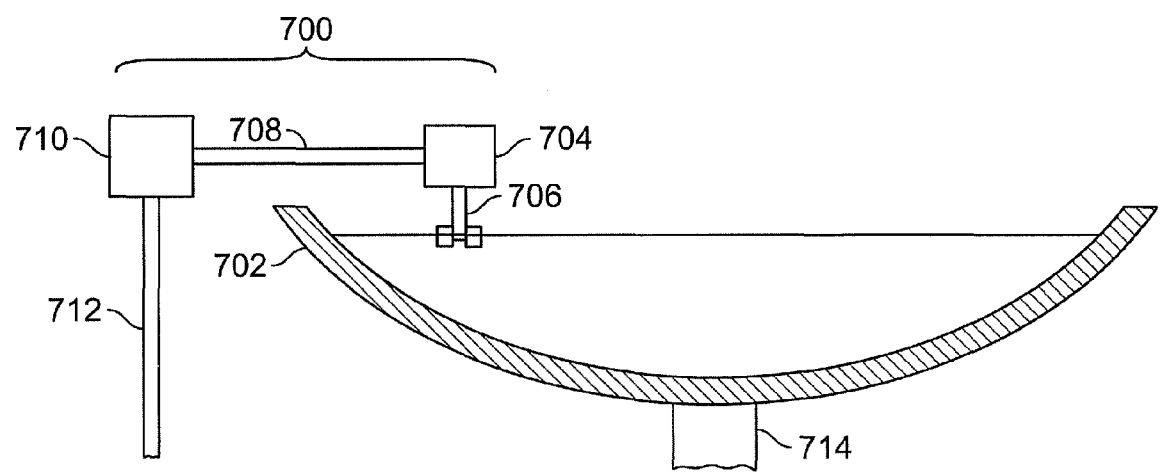
FIG. 17 illustrates a lateral view of a water agitation system according to another alternative embodiment of the present invention.

FIG. 17 illustrates a lateral view of a water agitation system 700 according to another alternative embodiment of the present invention. The water agitation system 700 is similar to the water agitation system 300 shown in FIG. 13 except that the water agitation system 700 is not mounted to a portion of the water retention structure 702. Instead, the housing 704 having a motor operatively connected to a drive shaft 706 is connected to a beam 708. The beam 708 is, in turn connected to a mounting member 710, which is supported by an upright member 712. The upright member 712 is separate and distinct from the water retention structure 702. The upright member 712 may be connected to a portion of a pedestal 714 supporting the water retention structure 702. Optionally, the upright member 712 may not be connected to the pedestal 714, and instead may be mounted directly into the ground. The upright member 712 may be a decorative pole or a statue capable of supporting the water agitation system 700. Alternatively, the water agitation systems 400, 500, and 600 may all be mounted to an upright member, such as upright member 712, instead of mounting to a portion of the water retention structure.

Figure 18:
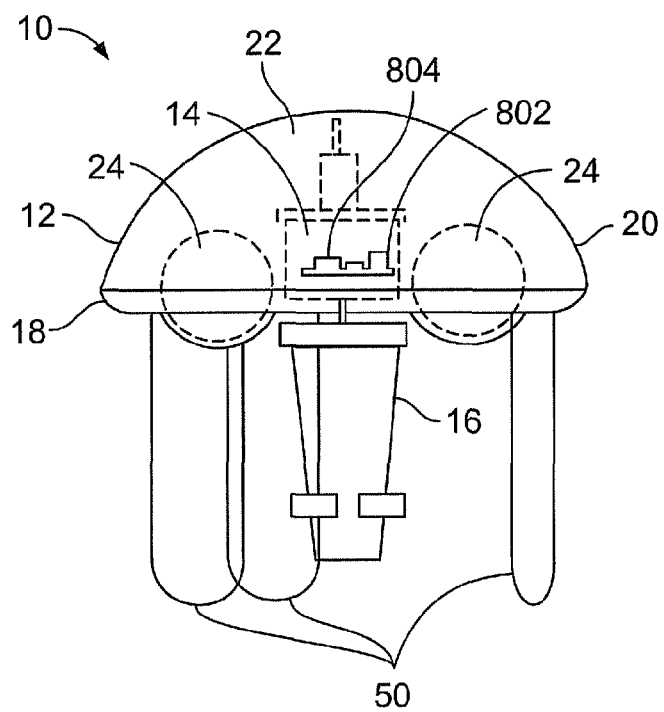
FIG. 18 illustrates a lateral view of a water agitation system comprising a sound system according to another alternative embodiment of the present invention.

FIG. 18 illustrates a lateral view of a water agitation system 10 comprising a sound system 802, 804 according to another alternative embodiment of the present invention. As in FIGS. 3 and 4, the housing 12 includes a base 18 and a cover 20 that define an inner compartment 22. A plurality of legs 50 extend downwardly from the base 18. Alternatively, the water agitation system 10 may include a flotation member, as shown for example, in FIG. 11. The motor 14 is mounted within the inner compartment 22 to protect against moisture and exposure. A sound board 802 and speaker 804 may also be disposed within the inner compartment and connected to a power source, such as batteries 24. However, alternative embodiments are envisioned. For example, it may be preferable to locate the speakers 804 outside the inner compartment 22. Similarly, the sound board 802 may be outside the inner compartment 22.

The sound board 802 may include circuitry arranged for storing and recalling information corresponding to sounds. The circuitry may include digital circuitry that stores sounds in a digital format. One or more sounds may be stored. The circuitry may also have circuitry arranged to recall the digitally stored sounds. The sounds may be recalled in a variety of ways. For example, the sounds may be recalled continuously in a loop. As another example, the sounds may be recalled at random intervals. As yet another example, the sounds may be recalled in a manner that combines aspects of random recall and loop recall.

The digitally stored sounds may be representative of a variety of sounds found in nature. For example, the digitally stored sounds may be representative of moving water sounds. Moving water sounds may include, but are not limited to, sounds representative of rain, waterfalls, rapids, water chutes, waves, water landing on water, and water landing on rock. The digitally stored sounds may also be representative of sounds of wildlife. Wildlife sounds may include, but are not limited to, sounds representative of birds, fish, mammals, amphibians, insects, and reptiles. For example, wildlife sounds may include sounds representative of those found near a body of moving water, such as frogs, insects, and water-loving birds. While the general goal may be to attract certain species, it may also be desirable to configure sounds intended to repel certain species as well.

After the sound is recalled, it may be processed by a variety of sound processing functions including buffers, amplifiers, and filters. Sound storage, recall, and processing may be performed by a variety of hardware and software components. Some or all of sound processing functions may be implemented with one or more micro-controller, digital signal processor, or application-specific integrated circuit.

After processing, the recalled sound is communicated to one or more speakers 804. The speaker 804 may be located on the sound board, or may be disposed at another location in the inner compartment 22. Alternatively, the speaker 804 may be disposed at a remote location outside the housing 12. As another example, the speaker 804 may be mounted on the cover 20. According to an embodiment, the speaker 804 includes a piezoelectric crystal. The piezoelectric crystal may be disposed in the inner compartment 22. According to another embodiment, the cover 20 of the housing 12 may be in acoustic communication with a speaker 804 disposed in the inner compartment 22 such that the cover 20 resonates in response to the speaker 804. By employing the cover 20 to resonate, it may be possible to project sounds from the cover 20 itself. The cover 20 may transmit or amplify sounds generated by the water agitation system 10. With this configuration, it is possible to project wildlife-attracting sounds outwardly from the housing 12 from a relatively low-power speaker in the inner compartment 22. Moreover, the projection of sound using the cover 20 as a resonator may be achieved without openings in the housing 12. It may be preferable to select a cover 20 configuration to provide efficient transmission of acoustical energy for a desired range of frequencies. For example, it may be preferable to select a cover 20 configuration such that low frequencies are efficiently transmitted. Similarly, other acoustical designs may be desired for certain applications. For example, a material that absorbs acoustical energy in a certain frequency range, such as foam, may be included in the water agitator system 10. Using an acoustical absorber, it may be possible to diminish the projection of sounds from the motor 14 or agitation mechanism 16 during operation of the water agitation system 10.

One or more batteries 24 may be provided to provide power to the sound board 802 and speaker 804. The batteries 24 may be rechargeable. For example, rechargeable batteries may be recharged through an available alternating current (AC) supply, such as a household electrical outlet. It may be preferable to provide power directly from an AC supply without batteries 24. As another example, batteries 24 may be recharged by componentry, such as a solar module shown in FIG. 19, configured to convert light energy into electrical energy.

A switch, timer, or volume control (not shown) may be provided for selectively delivering power to the sound board 802 and speaker 804. Certain switches may be configured to be actuated in an automated fashion. For example, a photocell sensor, like the photocell sensor 62 shown in FIG. 4, may be used to activate or deactivate the sound board 802 or speaker 804. As another alternative, a timer (not shown) may be provided to allow the user to set the time(s) during which the sound board 802 or speaker 804 is active and inactive. When a photocell or timer is provided, it may also be desirable to provide a bypass mechanism for bypassing the photocell or timer. Such a bypass mechanism may take the form of a switch (not shown). Alternatively, a wire within the housing can be moved between terminals to bypass the photocell or timer. As another example, a switch (not shown) may be provided to allow the user to manually activate or deactivate the sound board 802 or speaker 804. As another alternative, a volume control may be provided to adjust the power delivered to the sound board 802 or speaker 804. A variety of volume control techniques may be employed. For example, volume control circuitry and a corresponding user interface, such as a knob, may be located on the sound board 802 or the speaker 804.

Figure 19:
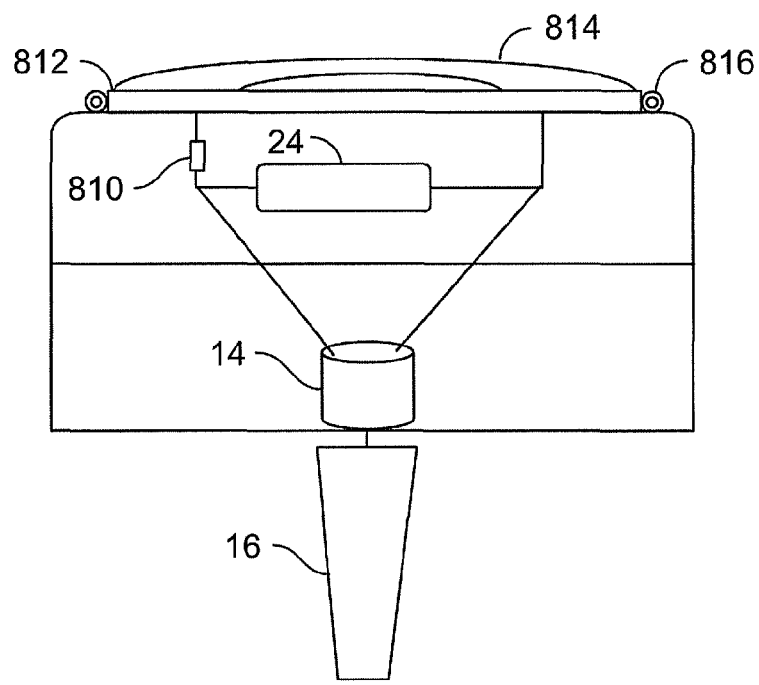
FIG. 19 illustrates a lateral view of a water agitation system comprising solar power according to another alternative embodiment of the present invention.

FIG. 19 illustrates a lateral view of a water agitation system comprising solar power according to another alternative embodiment of the present invention. The battery 24 is shown in electrical connection with the motor 14. The battery 24 may include one or more batteries 24 in series, parallel, or in combination of series and parallel. The battery 24 may be rechargeable. The battery 24 and motor 14 are shown in the inner compartment 22 of the housing 12. Outside the housing 12, a solar module 812 is depicted. The solar module 812 is capable of converting light energy into electrical energy. On the exterior surface of the solar module 812, a protective coating 814 may be provided to prevent ultraviolet rays from damaging the solar module 812 or the components in the inner compartment 22. The protective coating 814 may include, for example, a protective epoxy. The protective coating 814 may also be substantially resistant to moisture penetration. To further prevent exterior contaminants such as moisture and ultraviolet rays from penetrating into the inner compartment 22, at least one seal 816 may be situated between the outer perimeter of the solar module 812 and the housing 12. The seal 816 may be substantially resistant to moisture penetration.

The solar module 812 may be configured in electrical connection with a rechargeable battery 24. A diode 810 may be interposed along at least a portion of the electrical connection between the battery 24 and the solar module 812. The diode 810 may regulate an electrical current for recharging the battery 24 that flows between the battery 24 and the solar module 812. According to an embodiment, the solar module 812 preferably provides at least 3 volts of potential in open circuit, and is capable of providing 100 milliamps of current when connected in a closed circuit. It may be desirable to choose a rechargeable battery 24 capable of delivering power to the motor 14 and the sound board 802 and speaker 804 (shown in FIG. 18) during night. Similarly, it may be desirable to choose a rechargeable battery capable of delivering power on overcast and winter days when there is less available sunlight. According to an embodiment, the rechargeable battery may be capable of storing at least 1000 milliamp-hours of energy.

Figure 20:
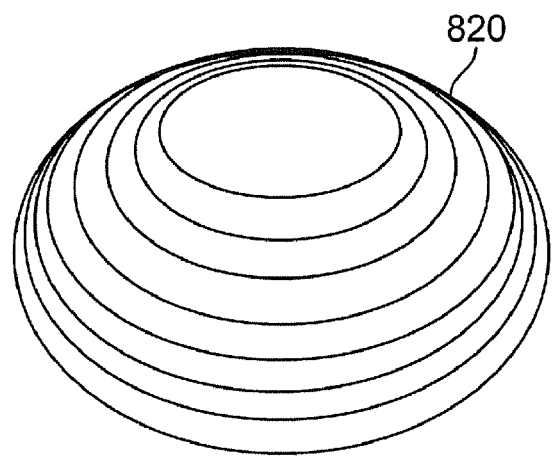
FIG. 20 illustrates a perspective view of an outer shell for a water agitation system according to another alternative embodiment of the present invention.
Figure 21:
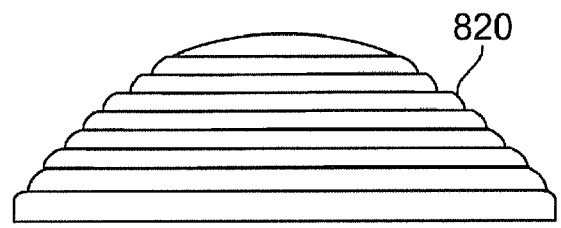
FIG. 21 illustrates a lateral view of an outer shell for a water agitation system according to another alternative embodiment of the present invention.
Figure 22:
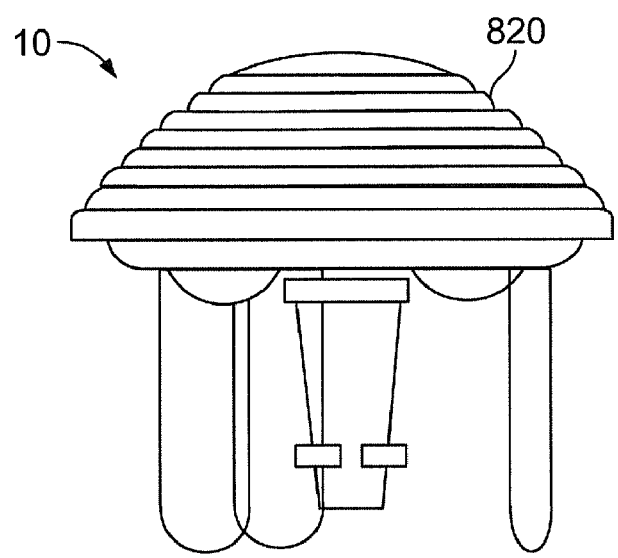
FIG. 22 illustrates a lateral view of a water agitation system comprising an outer shell according to another alternative embodiment of the present invention.

FIGS. 20, 21, and 22 illustrate an outer shell for a water agitation system according to another alternative embodiment of the present invention. An outer shell 820 may be provided in a water agitation system 10. A variety of outer shell 820 configurations may be possible. For example, as depicted in FIGS. 20, 21, and 22, the outer shell 820 may take the shape of a dome-like beehive shape. The outer shell 820 may comprise a variety of materials including pottery, terra cotta, ceramics, or plastics. The outer shell 820 may include a variety of colors and patterns. The colors and patterns may be included in the selected materials, or may be added to the materials through processes such as painting. The outer shell 820 configuration, materials, colors and patterns may be selected based on a variety of considerations including heat absorption, water resistance, precipitation runoff, durability, cleanability, hardness, attractiveness to wildlife species, and acoustic properties. The outer shell 820 may be provided in addition to the cover 20, or may be part of the cover 20.

The outer shell 820 may rest on the housing 12 without attachment, or may be secured to the housing 12. The outer shell 820 may be secured by any of a variety of well known methods for securing objects, such as glue, epoxy, silicone sealant, fasteners, screws, bolts, clamps, snaps, rivets, and the like.

In an embodiment, a foam liner is interposed between the outer shell 820 and the housing 12. The foam liner may cushion the outer shell 820 from rubbing and jostling the housing 12. The foam liner may also assist in supporting and maintaining the position of the outer shell 820. The foam liner also makes it relatively simple to replace or change the outer shell 820. For example, a user of a water agitator system 10 may have a variety of outer shells 820, each of which are designed to attract different seasonal species of birds. As the seasons and the birds change, the user can simply lift off outer shell 820 designed to attract the previous season's birds, and replace it with an outer shell 820 designed to attract the current season's birds. Additionally, the foam may be chosen for acoustical properties. For example, the foam may be chosen to damp sounds emanating from the motor 14 and agitation mechanism 16 in the water agitation system 10. As another example, the foam may be chosen to prevent the housing 12 or the outer shell 820 from resonating, transmitting or amplifying sounds that may not attract wildlife.

Figure 23:
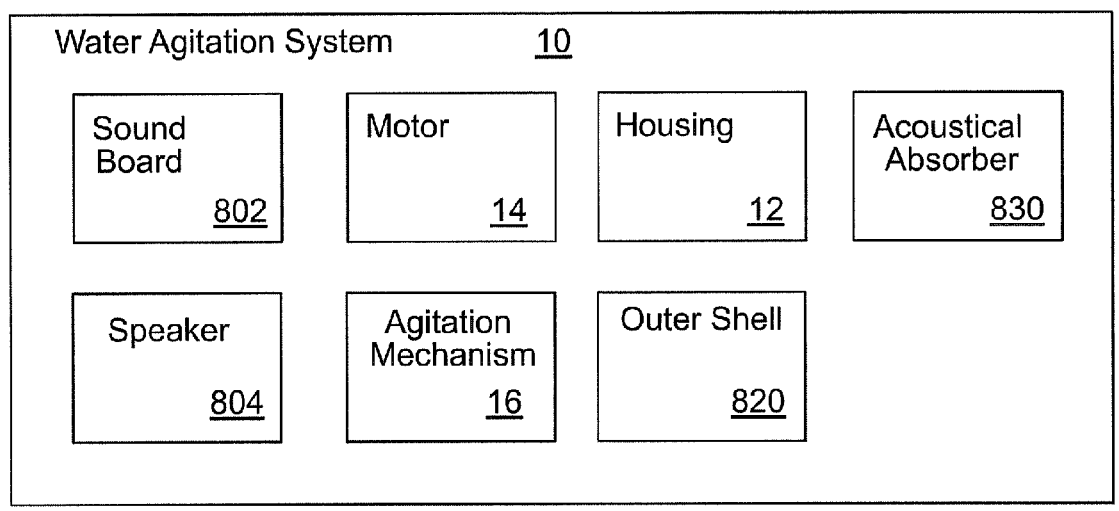
FIG. 23 illustrates a schematic diagram of a water agitation system according to another alternative embodiment of the present invention.

FIG. 23 illustrates a schematic diagram of a water agitation system according to another alternative embodiment of the present invention. The water agitation system 10 includes a motor 14 and an agitator 16. An acoustical absorber 830 is also included in the water agitation system 10. The acoustical absorber 830 may damp sounds from the motor 14 and agitation mechanism 16. The acoustical absorber 830 may also prevent the housing 12 from acoustically transmitting sounds from the water agitation system 10. For example, the acoustical absorber 830 may dampen vibrations in the housing 12. Similarly, the acoustical absorber 830 may dampen vibrations in an optional outer shell 820. The water agitation system may also optionally include a sound board 802 and speaker 804. The acoustical absorber 830 may be selected to reduce transmission of sounds from the motor 14 and agitation mechanism 16, while still allowing a substantial amount of sound from the sound board 802 and speaker 804 to be acoustically transmitted from the water agitation system 10.

Thus, embodiments of the present invention provide an apparatus for imparting motion to water retained within water retaining structures, such as a bird bath. As discussed above, embodiments of the present invention may be used with various types of water retention structures, such as swimming pools, bird baths, ponds, and the like, in which water may stagnate. Embodiments of the present invention may be sized and shaped according to the size and shape of the water retention structure in which the water agitation system is used. The water agitation system may be battery powered, solar powered, or powered through a standard electrical outlet.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A liquid agitation system configured to be positioned within a liquid retention structure, comprising:
 a main body positionable within a liquid retention area of the liquid retention structure;
 an agitation assembly comprising an agitator operatively connected to a motor housed substantially within said main body; and
 an audio source connected to said motor housed substantially within said main body, said audio source produces sounds that attract at least a first species of wildlife, wherein the sounds comprises one or both of wildlife sounds or water sounds.

2. The liquid agitation system of claim 1 further comprising at least one power source configured to supply power to said motor and said audio source.

3. The liquid agitation system of claim 2, wherein said power source comprises at least one battery.

4. The liquid agitation system of claim 2, wherein said power source comprises an alternating current source.

5. The liquid agitation system of claim 3 further comprising a solar module configured to recharge said at least one battery.

6. The liquid agitation system of claim 1, wherein at least a portion of said body resonates responsively to at least a portion of audible frequencies.

7. The liquid agitation system of claim 1, wherein said audio source comprises at least one speaker.

8. The liquid agitation system of claim 7 wherein said at least one speaker comprises a piezoelectric crystal.

9. The liquid agitation system of claim 1, wherein said audio source comprises digital circuitry configured to provide electrical signals to at least one speaker.

10. The liquid agitation system of claim 1 further comprising an acoustical absorber capable of damping at least a portion of sounds generated at least in part by said liquid agitation system.

11. The liquid agitation system of claim 10, wherein said acoustical absorber comprises foam.

12. The liquid agitation system of claim 1 further comprising an outer shell capable of being positioned on said body.

13. The liquid agitation system of claim 12 further comprising foam at least partially interposed between said body and said outer shell.

14. The liquid agitation system of claim 12 wherein said outer shell is part of said body.

15. The liquid agitation system of claim 12, wherein said outer shell is formed of at least one of: pottery, terra cotta, ceramic, and plastic.

16. The liquid agitation system of claim 12, wherein said outer shell has a beehive shape.

17. A wildlife attracting system comprising:
at least one electric power supply;
a motor housed substantially within a main body;
an audio source connected to said motor housed substantially within said main body, each of said motor and said audio source being configured to draw electrical energy from said at least one electric power supply, said motor adapted to transform at least a portion of said electrical energy into mechanical energy, and said audio source adapted to transform at least a portion of said electrical energy into acoustical energy, said audio source configured to produce sounds that attract at least a first species of wildlife, wherein the sounds comprise one or both of wildlife sounds or water sounds; and
an agitator operatively connected to said motor, wherein said agitator is configured to be disposed in a liquid, said agitator adapted to transfer mechanical energy from said motor to said liquid.

18. The wildlife attracting system of claim 17, wherein said at least one electric power supply further comprises a battery.

19. The wildlife attracting system of claim 17, wherein said at least one electric power supply further comprises a solar module.

20. The wildlife attracting system of claim 19, wherein said solar module is configured to recharge a battery.

21. The wildlife attracting system of claim 19, wherein at least a portion of said solar module is positioned on a housing of said wildlife attracting system.

22. The wildlife attracting system of claim 17, wherein said at least one electric power supply comprises an alternating current source.

23. The wildlife attracting system of claim 17 further comprising a switch configured to reduce said draw of said electric energy.

24. The wildlife attracting system of claim 17, wherein said switch is automatedly configurable.

25. The wildlife attracting system of claim 17 further comprising a housing, said housing further comprising a cover.

26. The wildlife attracting system of claim 25 further comprising an outer shell positionable on at least a portion of said housing.

27. The wildlife attracting system of claim 26 further comprising foam interposed between at least a portion of said housing and at least a portion of said outer shell.

28. The wildlife attracting system of claim 26, wherein said cover comprises said outer shell.

29. A wildlife attracting system comprising:
a substantially water resistant housing having an interior space;
an agitator assembly comprising a motor within said substantially water resistant housing and operatively connected to an agitator, said motor adapted for driving said agitator, and said motor capable of generating acoustical energy that propagates along a propagation path;
and an acoustically absorptive material positioned along at least a portion of said propagation path; and
an audio source connected to said motor, said audio source configured to produce sounds that attract at least a first species of wildlife wherein the sounds comprise one or both of wildlife sounds or water sounds.

30. The wildlife attracting system of claim 29 further comprising an outer shell positionable on at least a portion of said housing.

31. The wildlife attracting system of claim 30, wherein said acoustically absorptive material is interposed between at least a portion of said outer shell and at least a portion of said housing.

32. The wildlife attracting system of claim 30, wherein said housing comprises said outer shell.

33. The wildlife attracting system of claim 29 further comprising a power subsystem electrically coupled to said motor.

34. The wildlife attracting system of claim 33, wherein said power subsystem comprises a solar module.

35. The wildlife attracting system of claim 30, wherein said outer shell is formed of at least one of: pottery, terra cotta, ceramic, and plastic.

36. The wildlife attracting system of claim 30, wherein said outer shell has a beehive shape.

* * * * *